US008199445B2

(12) United States Patent
Maruyama et al.

(10) Patent No.: US 8,199,445 B2
(45) Date of Patent: Jun. 12, 2012

(54) GAS INSULATED CIRCUIT BREAKER SYSTEM AND GAS INSULATED CIRCUIT BREAKER MONITORING METHOD

(75) Inventors: Shiro Maruyama, Kanagawa (JP); Takashi Nakajima, Kanagawa (JP); Hiroyuki Hayata, Kanagawa (JP); Kazuhide Bannai, Chiba (JP); Kozo Matsushita, Kanagawa (JP); Hideo Ishizuka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 426 days.

(21) Appl. No.: 12/580,527

(22) Filed: Oct. 16, 2009

(65) Prior Publication Data

US 2010/0102036 A1 Apr. 29, 2010

(30) Foreign Application Priority Data

Oct. 24, 2008 (JP) ................................ 2008-274363

(51) Int. Cl.
*H02H 9/06* (2006.01)
*H01H 33/16* (2006.01)

(52) U.S. Cl. ................ 361/2; 361/8; 361/120; 218/102; 324/512

(58) Field of Classification Search .................. 361/2, 8, 361/120; 218/102; 324/512
See application file for complete search history.

(56) References Cited

U.S. PATENT DOCUMENTS 3,164,705 A * 1/1965 Cromer .......................... 218/43
3,235,695 A * 2/1966 Forwald .......................... 218/68
3,452,172 A * 6/1969 Kesselring ........................ 218/8
4,035,692 A * 7/1977 Luy et al. ...................... 361/103
4,069,406 A * 1/1978 Meinders ...................... 218/143
4,439,651 A * 3/1984 Thuries et al. ................ 218/143
5,241,294 A * 8/1993 Pham et al. ..................... 338/21
6,072,673 A * 6/2000 Chen et al. ........................ 361/9
7,630,185 B2 * 12/2009 Fiesoli et al. ................ 361/93.1
7,869,170 B2 * 1/2011 Colsch et al. .................. 361/42

* cited by examiner

*Primary Examiner* — Rexford Barnie
*Assistant Examiner* — Zeev V Kitov
(74) *Attorney, Agent, or Firm* — Oblon, Spivak, McClelland, Maier & Neustadt, L.L.P.

(57) ABSTRACT

A gas insulated circuit breaker system has: a container that encapsulates insulating gas; a main contact in the container that opens/closes the main circuit; a resistor contact in the container, connected in parallel to the main contact, to be opened after elapse of a predetermined time after the main contact is opened and to be closed at a predetermined time before the main contact is closed; a resistor in the container, serially connected to the resistor contact and connected in parallel to the main contact together with the resistor contact; a temperature sensor that measures temperature of surrounding of the resistor; and a temperature estimation section that estimates a temperature of the resistor based on a timing of opening/closing operation of the main contact, a current flowing through the main circuit and the measured temperature.

9 Claims, 3 Drawing Sheets

GAS INSULATED CIRCUIT BREAKER SYSTEM AND GAS INSULATED CIRCUIT BREAKER MONITORING METHOD

CROSS REFERENCES TO RELATED APPLICATIONS

This application is based upon and claims the benefits of priority from the prior Japanese Patent Application No. 2008-274363, filed in the Japanese Patent Office on Oct. 24, 2008, the entire content of which is incorporated herein by reference.

BACKGROUND OF THE INVENTION

The present invention relates to a gas insulated circuit breaker system with a resistor and a gas insulated circuit breaker monitoring method and, more particularly, to a technique that takes temperature rise of the resistor into consideration so as to improve operation performance of a gas insulated circuit breaker with resistor.

In a gas insulated circuit breaker used in an electric power substation, a resistor/contact connected member obtained by serially connecting a resistor contact and a resistor is connected in parallel to a main contact in order to suppress a surge voltage generated at the contact closing/opening time. At the contact closing time, the resistor contact is closed before the closing of the main contact, and at the contact opening time, the resister contact is opened after the opening of the main contact. At the operating time, a large energy is injected to the resistor to heat the resistor up to 200° C. to 300° C. Thus, when the resistor has a large resistance value in the high temperature range of 200° C. to 300° C., an over-current may flow through the resistor. If the resistor breaks down due to the flowing of over-current, a thermo-runaway may occur (refer to, e.g., Japanese Patent Application Laid-open Publication No. 05-041302, the entire content of which is incorporated herein by reference).

The above mentioned conventional gas insulated circuit breaker with resistor needs to wait, after breaking a fault current, until the temperature of the resistor is lowered to a level at which the resistor does not break down due to a temperature rise caused by the subsequent operation. Since the conventional gas insulated circuit breaker does not have a means for detecting the temperature of the resistor, it needs to wait for a certain period of time.

BRIEF SUMMARY OF THE INVENTION

The present invention has been made to solve the above mentioned problem, and an object thereof is to estimate or predict the temperature of a circuit-breaker resistor or a wait time required until the subsequent operation becomes ready without additionally providing a sensor for directly measuring the temperature of the resistor so as to improve operation of a gas insulated circuit breaker with resistor.

According to the present invention, there is provided a gas insulated circuit breaker system comprising: a container that encapsulates an insulating gas; a main contact that is contained in the container and opens and closes a main circuit; a resistor contact that is contained in the container, connected in parallel to the main contact, and configured to be opened after elapse of a predetermined time after the main contact is opened and to be closed at a predetermined time before the main contact is closed; a resistor that is contained in the container, serially connected to the resistor contact, and connected in parallel to the main contact together with the resistor contact; a temperature sensor that measures a temperature of surrounding of the resistor; and a temperature estimation section that estimates a temperature of the resistor based on a contact signal representing a timing of opening and closing operation of the main contact, a current signal representing a current flowing through the main circuit, and a temperature signal output from the temperature sensor.

According to the present invention, there is also provided a gas insulated circuit breaker monitoring method for monitoring a gas insulated circuit breaker comprising: a container that encapsulates an insulating gas; a main contact that is contained in the container and opens and closes a main circuit; a resistor contact that is contained in the container, connected in parallel to the main contact, and configured to be opened after elapse of a predetermined time after the main contact is opened and to be closed at a predetermined time before the main contact is closed; and a resistor that is contained in the container, serially connected to the resistor contact, and connected in parallel to the main contact together with the resistor contact, the method comprising: a contact signal input step of inputting a contact signal representing a timing of opening and closing operation of the main contact; a main circuit current input step of inputting a current signal representing a current flowing through the main circuit; a temperature measurement step of measuring a temperature of surrounding of the resistor; a temperature signal input step of inputting a temperature signal obtained in the temperature measurement step; and a temperature estimation step of estimating the temperature of the resistor based on the contact signal, the current signal, and the temperature signal.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Figure 1:
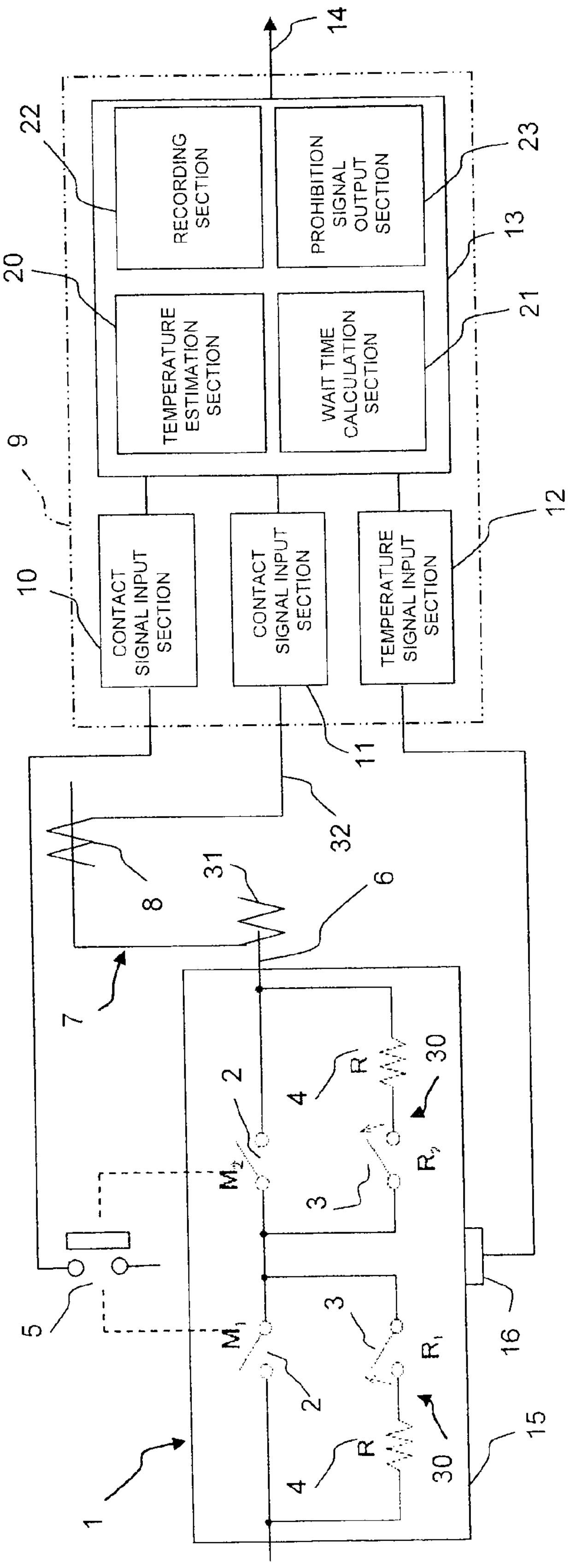
FIG. 1 is a block diagram schematically showing a first embodiment of a gas insulated circuit breaker system according to the present invention.

Embodiments of a gas insulated circuit breaker system according to the present invention will be described below with reference to the accompanying drawings. The same reference numerals are given to the same or similar parts, and the repeated description will be omitted.

Further, the embodiments described below are merely given as examples, and it should be understood that the present invention is not limited thereto.

First Embodiment

Figure 2:
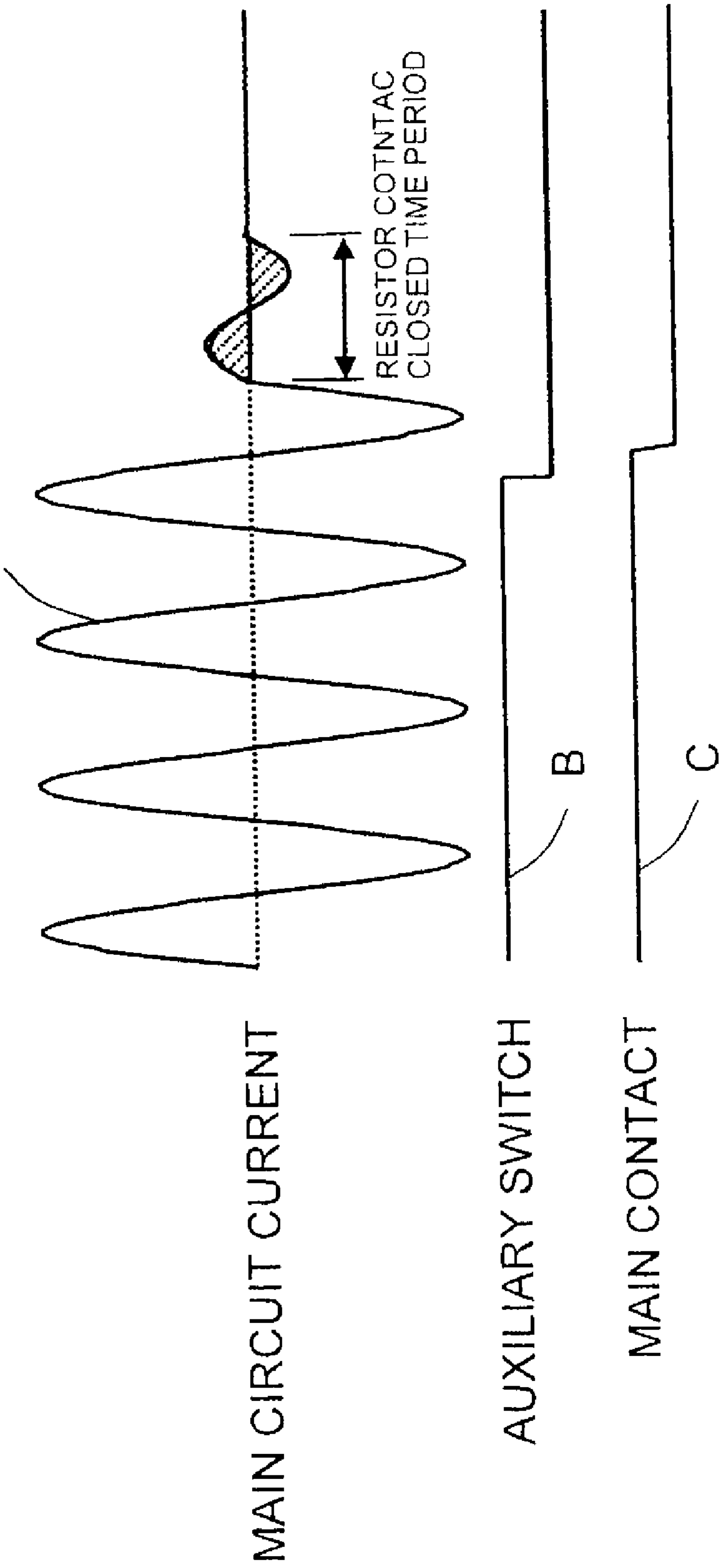
FIG. 2 is a time chart at the main circuit closing time in the first embodiment, in which line "A" shows a main circuit current, line "B" shows an operation of an auxiliary switch, and line "C" shows an operation of a main contact.

FIG. 1 is a block diagram schematically showing a first embodiment of a gas insulated circuit breaker system according to the present invention. FIG. 2 is a time chart at the main circuit closing time in the first embodiment, in which line "A"

shows a main circuit current, line "B" shows an operation of an auxiliary switch, and line "C" shows an operation of a main contact.

The gas insulated circuit breaker 1 with resistor includes main contacts 2 disposed in a metal container 15 in which an insulating gas is encapsulated and connected in a main circuit 6. In the example shown in FIG. 1, two main contacts are serially connected to each other. To the respective main contacts 2, resistor/contact connected members 30 are connected in parallel. Each of the resistor/contact connected members 30 is constructed by serially connecting a resistor 4 and a resistor contact 3. The two pairs of the main contacts 2 and resistor/contact connected members 30 are contained in one common metal container 15. A temperature sensor 16 is attached to the metal container 15.

When an opening command is issued from a higher level system (not shown) in a state where all the main contacts 2 and resistor contacts 3 are closed, the two main contacts 2 are opened first and, after elapse of a predetermined time, the two resistor contacts 3 are opened. When an opening command is issued from a higher level system in a state where all the main contacts 2 and resistor contacts 3 are opened, the two resistor contacts 3 are closed first and, after elapse of a predetermined time, the two main contacts are closed.

A main circuit current measurement circuit 7 including a current transformer 31 is provided in the main circuit 6 at the outside of the metallic container 15. The main circuit current measurement circuit 7 is connected to a not shown protective relay and the like. Further, an auxiliary current transformer 8 is provided in the main circuit current measurement circuit 7 to constitute an auxiliary current measurement circuit 32.

A signal processor 9 is provided near the gas insulated circuit breaker 1 with resistor. The signal processor 9 includes a contact signal input section 10, a current signal input section 11, a temperature signal input section 12, and calculation/storage section 13. The calculation/storage section 13 includes a temperature estimation section 20, a wait time calculation section 21, and a recording section 22.

An auxiliary switch 5 is opened and closed in conjunction with the main contact 2, and a contact signal from the auxiliary switch 5 is input to the contact signal input section 10. The input signal is converted into a digital signal by the contact signal input section 10 and then input to the calculation/storage section 13.

A main circuit current signal output from the auxiliary current transformer 8 is input, via the auxiliary current measurement circuit 32, to the current signal input section 11 where the input signal is subjected to analog/digital conversion and then input to the calculation/storage section 13.

A signal from the temperature sensor 16 is input to the temperature signal input section 12 where the input signal is subjected to analog/digital conversion and input to the calculation/storage section 13. The calculation/storage section 13 is connected to the higher level system by a transmission line 14.

FIG. 2 shows, in the form of a graph, current information recorded in the calculation/storage section 13, operation information of the auxiliary switch 5, and operation information of the main contact 2 in the present embodiment. Hereinafter, with reference to FIG. 2, operation of processing of calculating temperature rise of the resistor 4 performed in the gas insulated circuit breaker system with resistor will be described in detail.

A temperature rise "ΔT" of the resistor 4 can be calculated according to the following equation (1).

$$\Delta T = \int \{Ir(t)\}2dt \cdot R/\alpha \quad (1)$$

where "Ir" is an electric current flowing through the resistor, "R" is a resistance value of the resistor, and "α" is a specific heat ratio of the resistor.

A change in an electric current at the time when a circuit breaker breaks a fault current and a change in a status of the main contact 2 of the circuit breaker are shown in FIG. 2. The calculation/storage section 13 samples the electric current at a predetermined frequency and performs the integration with respect to an electric current after the circuit breaker main contact 2 is opened and separated to cause the electric current to be transferred to the resistor contact 3 (shaded area in FIG. 2) according to the equation (1) to thereby calculate the temperature rise ΔT of the resistor. In order to obtain the transfer timing, the opening timing of the main contact 2 is calculated from a signal change in the auxiliary switch 5 of the main contact, and zero point before a current level becomes smaller after the opening timing of the main contact 2 is detected.

The temperature "Tr0" of the resistor can be calculated according to the following equation (2).

$$Tr0 = Tamb + \Delta T + \beta \quad (2)$$

where "Tamb" is the temperature of the metal container obtained using the temperature sensor, and "β" is an estimated temperature rise due to the electric current and the direct insolation.

A change in the resistor temperature "Tr" after operation of the circuit breaker can be calculated according to the following equation (3).

$$Tr = \Delta T \cdot \exp(-t/\tau) + Tamb + \beta \quad (3)$$

where "t" is the time length after operation of the circuit breaker, and "τ" is the cooling time constant of the resistor.

Through the above described calculations, the temperature estimation section 20 of the signal processor 9 can estimate the temperature of the resistor 4 after breaking of a fault current. Further, a wait time required until the subsequent operation becomes ready can be calculated in the wait time calculation section 21. These calculation results are recorded in the recording section 22, allowing the calculated wait time to be notified, via the transmission line 14, to the upper level system that outputs an operation command to the gas insulted circuit breaker 1 with resistor as transmission data.

Further, a prohibition signal output section 23 that outputs a signal for prohibiting operation for the gas insulated circuit breaker 1 with resistor during the wait time may be optionally provided in the calculation/storage section 13.

As described above, in the present embodiment, it is possible to estimate the temperature of the resistor without need to directly measure the temperature of the resistor to which a high voltage is applied, i.e., without changing the structure of the circuit breaker. Therefore, determination on the operation for the circuit breaker can be rationalized to thereby increase reliability of the circuit breaker.

Further, in the present embodiment, the auxiliary current transformer 8 is provided in the main circuit current measurement circuit 7, and a main circuit current signal output from the auxiliary current transformer 8 is input to the current signal input section 11 via the auxiliary current measurement circuit 32. Therefore, interference from the current signal input section 11 side to the main circuit current measurement circuit 7 is eliminated. Since the main circuit current measurement circuit 7 serves as an important circuit for transmitting main circuit current information to the higher level system, it is important that the main circuit current information to be transmitted to the higher level system is not interfered by the signal processor 9.

Second Embodiment

Figure 3:
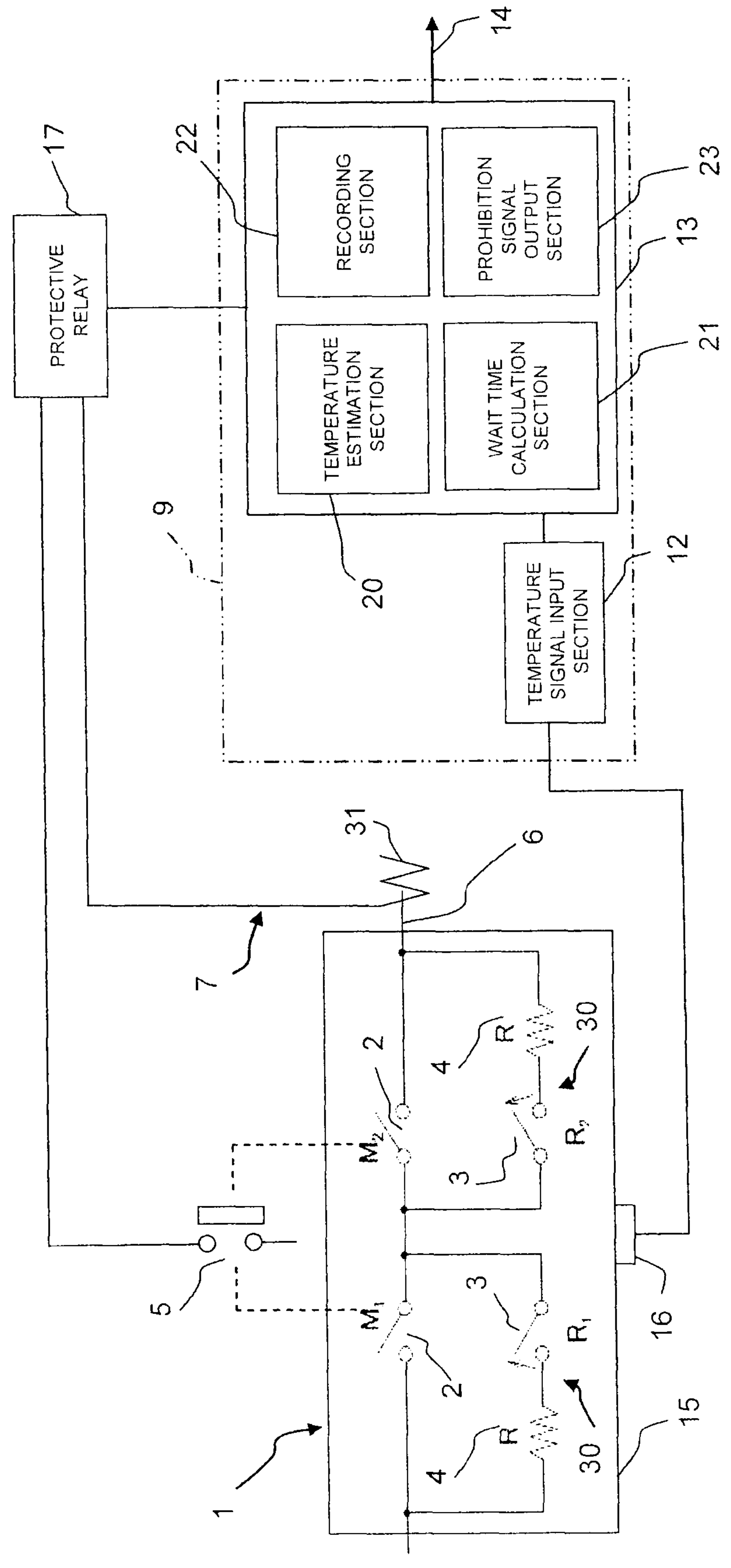
FIG. 3 is a block diagram schematically showing a second embodiment of the gas insulated circuit breaker system according to the present invention.

FIG. 3 is a block diagram schematically showing a second embodiment of the gas insulated circuit breaker system according to the present invention. In the second embodiment, signals of the auxiliary switch 5 and main circuit current measurement circuit 7 are transmitted to a protective relay unit 17. Based on these signals, the operation timing signal of the main contact 2 and the electric current information of the main circuit 6 are input from the protective relay unit 17, via a transmission line 18, to the calculation/storage section 13 of the signal processor 9.

In the present embodiment, the auxiliary current transformer 8 and the auxiliary current measurement circuit 32 need not be provided. Further, in the present embodiment, a contact signal (contact signal of the auxiliary switch 5) representing the timing of opening/closing operation of the main contact 2 and a signal representing the current flowing through the main circuit 6 are converted into digital signals in the protective relay unit 17 and are input, via the transmission line 18, to the calculation/storage section 13 of the signal processor 9 as digital signals. Thus, an analog/digital conversion function such as the contact signal input section 10 or the current signal input section 11 of the first embodiment need not be provided in the signal processor 9 of the second embodiment. Thus, according to the second embodiment, the system structure can be simplified.

Other Embodiments

The embodiments described above are merely given as examples, and it should be understood that the present invention is not limited thereto. For example, although the temperature sensor 16 is attached to the metal container 15 that contains the main contact 2 and resistor/contact connected member 30 in the above mentioned embodiments, the temperature sensor 16 may be alternatively attached to another container connected to the metal container 15 or a structure provided near the metal container 15.

What is claimed is:

1. A gas insulated circuit breaker system comprising:
- a container that encapsulates an insulating gas;
- a main contact that is contained in the container and opens and closes a main circuit;
- a resistor contact that is contained in the container, connected in parallel to the main contact, and configured to be opened after elapse of a predetermined time after the main contact is opened and to be closed at a predetermined time before the main contact is closed;
- a resistor that is contained in the container, serially connected to the resistor contact, and connected in parallel to the main contact together with the resistor contact;
- a temperature sensor that measures a temperature of surrounding of the resistor; and
- a temperature estimation section that estimates a temperature of the resistor based on a contact signal representing a timing of opening and closing operation of the main contact, a current signal representing a current flowing through the main circuit, and a temperature signal output from the temperature sensor.

2. The gas insulated circuit breaker system according to claim 1, further comprising
- a wait time calculation section that calculates a wait time required until a subsequent opening or closing operation of the main contact becomes ready based on an output of the temperature estimation section and the temperature signal.

3. The gas insulated circuit breaker system according to claim 2, further comprising
- a prohibition signal output section that outputs, to a higher level system that controls opening and closing operation of the main contact, an operation prohibition signal for prohibiting the opening and closing operation of the main contact during the wait time.

4. The gas insulated circuit breaker system according to claim 1, further comprising
- an auxiliary switch that is provided outside the container and is opened and closed in conjunction with opening and closing operation of the main contact, wherein
- the contact signal is a signal representing a timing of opening and closing operation of the auxiliary switch.

5. The gas insulated circuit breaker system according to claim 1, wherein
- the temperature sensor is attached to the container or to a structure connected to the container.

6. The gas insulated circuit breaker system according to claim 1, wherein
- the contact signal is a signal that is received, upon occurrence of a fault requiring an opening operation of the main contact, from a protective relay that outputs a command of opening the main contact.

7. The gas insulated circuit breaker system according to claim 1, further comprising:
- a main circuit current measurement circuit that is attached to the main circuit, the main circuit current measurement circuit being connected to protective relay that outputs a command of opening the main contact and being configured to measure a current flowing through the main circuit; and
- an auxiliary current transformer that is attached to the main circuit current measurement circuit, wherein
- the current signal is an output of the auxiliary current transformer.

8. The gas insulated circuit breaker system according to claim 1, further comprising
- a main circuit current measurement circuit that is attached to the main circuit, the main circuit current measurement circuit being connected to a protective relay that outputs a command of opening the main contact and being configured to measure a current flowing through the main circuit, wherein
- the current signal is input from the protective relay.

9. A gas insulated circuit breaker monitoring method for monitoring a gas insulated circuit breaker comprising:
- a container that encapsulates an insulating gas; a main contact that is contained in the container and opens and closes a main circuit;
- a resistor contact that is contained in the container, connected in parallel to the main contact, and configured to be opened after elapse of a predetermined time after the main contact is opened and to be closed at a predetermined time before the main contact is closed; and
- a resistor that is contained in the container, serially connected to the resistor contact, and connected in parallel to the main contact together with the resistor contact,
- the method comprising:
- a contact signal input step of inputting a contact signal representing a timing of opening and closing operation of the main contact;
- a main circuit current input step of inputting a current signal representing a current flowing through the main circuit;
- a temperature measurement step of measuring a temperature of surrounding of the resistor;
- a temperature signal input step of inputting a temperature signal obtained in the temperature measurement step; and
- a temperature estimation step of estimating the temperature of the resistor based on the contact signal, the current signal, and the temperature signal.

* * * * *